United States Patent Office 2,980,662
Patented Apr. 18, 1961

2,980,662

MANUFACTURE OF OLEFIN POLYMERS

James L. Jezl, Swarthmore, Pa., assignor to Sun Oil Company, Philadelphia, Pa., a corporation of New Jersey No Drawing. Filed Nov. 27, 1956, Ser. No. 624,487

15 Claims. (Cl. 260—93.7)

This invention relates to new catalytic compositions especially applicable for the preparation of solid polymers of normally gaseous olefins, and to the preparation of solid polymers of ethylene, solid polymers of propylene, and solid copolymers of ethylene and propylene using the new catalytic compositions.

Normally gaseous olefins can be polymerized by a variety of catalysts. A catalyst which is especially effective for the polymerization of normally gaseous olefins to relatively high molecular weight, solid polymers is the combination of a lower halide of a metal, such as titanium trichloride, and an aluminum trialkyl, such as aluminum triethyl. This catalyst can be prepared by admixing, for example, titanium tetrachloride and aluminum triethyl in an inert liquid such as isooctane. On admixing the two components, a finely divided solid phase is formed as a dispersion in the inert liquid. This solid phase is a catalyst for polymerizing normally gaseous olefins to solid polymers. If desired, a lower halide such as titanium trichloride can be preformed, dispersed in an inert liquid, and an activator such as an aluminum trialkyl added. In performing the polymerization step, a normally gaseous olefin is contacted with the solid catalyst by passing the olefin through a suspension of the finely divided solid in the inert liquid, and is thereby polymerized to solid polymers. Other materials can be substituted for the titanium halide and/or the aluminum triethyl, as hereinafter described.

However, in this process, the solid catalyst particles are intimately associated with, and dispersed throughout, the solid polymer product. The separation of polymer from catalyst is extremely difficult. Means heretofore described for separating catalyst from polymer involve grinding the polymer-catalyst in the presence of a catalyst-deactivating material such as water, alcohol, or an aqueous inorganic acid, to expose portions of the catalyst particles to the action of such deactivating material and simultaneously or subsequently extracting the deactivated catalyst from polymer. This separation means is unsatisfactory in that removal of even a major proportion of the catalyst is difficult and the catalyst is deactivated. Hence, such processes of necessity are batch-type and expensive.

An object of the present invention is to provide new catalytic compositions especially effective for the polymerization of normally gaseous olefins. Another object is to provide a process for the preparation of solid polymers of normally gaseous olefins in which polymer is separated from catalyst without deactivating the catalyst. A further object is to provide a catalytic composition which can be readily separated from polymers of olefins prepared in contact therewith. Other objects and their achievement in accordance with the present invention will be apparent hereinafter.

The new catalyst of the invention consists essentially of solid particles of a lower halide of titanium or zirconium embedded in a substantially inert solid carrier. This composition is employed together with an activator, and this combination forms a new catalytic composition. At least a part of the solid lower halide particles are only partially embedded in the solid carrier material, i.e., at least a part of such particles present an exposed surface. This catalytic composition, used together with an activator such as an aluminum trialkyl, is an effective catalyst for the polymerization of normally gaseous olefins to solid polymers. After or during the polymerization reaction, polymer can be removed from catalyst by mild scraping of the catalyst surface so that the polymer is removed from the catalyst and the catalyst surface thereby regenerated for further polymerization. Alternatively, in a specific embodiment, the solid carrier is dissolved in a solvent thereby exposing, without grinding, a portion of the catalyst particles which can simultaneously, or subsequently be removed from the polymer.

In an embodiment of the invention, particles of titanium trichloride are partially embedded in the surface of solid sodium aluminum chloride so that a portion of the particles is exposed and the particles are firmly held by the sodium aluminum chloride. In another embodiment of the invention, particles of titanium trichloride are dispersed throughout solid sodium aluminum chloride so that a portion of the titanium trichloride particles always present an exposed surface through the surface of the solid sodium aluminum chloride.

The catalytic compositions of the invention are prepared by dispersing titanium trichloride particles on the surface of the carrier material while the carrier is in the molten state, and solidifying the carrier material so that the particles of titanium trichloride are firmly seated in the surface of the carrier. When it is desired to disperse titanium trichloride throughout the carrier material, an appropriate quantity of titanium trichloride particles is added to the carrier maintained in molten state and the admixture agitated such as by stirring to obtain a substantially homogeneous admixture. The mass is cooled. This mass is then cast into pellets or ground to form particles having exposed catalytically active surfaces.

As above described, an activator is necessary to perform the polymerization step of the process of the invention. The activator can be combined with the metal halide-carrier composition prior to, or together with, the addition of olefin. It is convenient to contact a solution of the activator in an inert liquid with the catalyst. Aluminum trialkyls are the preferred activators, but other materials which can be used include other metal alkyls, metal hydrides, metal borohydrides and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium, phenylisopropylpotassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used are Grignard reagents such as methylmagnesium bromide, ethylmagnesium chloride, phenylmagnesium bromide, and the like. Such activators are contacted with the catalytic compositions prior to, or simultaneously with, olefin polymerization. After polymer removal from the catalyst, as above described, it is frequently desirable to add an additional quantity of activator for additional polymerization. Only a relatively small quantity of the activator is necessary, but an excess is not deleterious. Generally a mole ratio of activator to titanium trichloride of from about 1:10 to 10:1, based on the quantity of titanium particles exposed through the surface of the carrier, gives good results.

The use of titanium trichloride as a catalystic material is a preferred embodiment of the invention but zirconium trichloride can be used with good results. Also other lower chlorides, such as the dichlorides, can be present in substantial amount, and such other chlorides are also catalytically active. For example, titanium trichloride may contain a quantity of titanium dichloride and zirconium trichloride may contain a quantity of zirconium dichloride, and good results obtained.

Carrier materials which can be used in the process of the invention must have relatively low melting points. When titanium trichloride is employed, the melting point of the carrier must be below 440° C. and when zirconium trichloride is employed, the melting point must be below 350° C. The carrier must be substantially unreactive toward the metal chloride used, toward the activator employed in the process as hereinafter described, and toward the olefins used in the polymerization process. However, in some instances, especially with sodium aluminum chloride, the solid carrier appears to assist in the polymerization reaction. Sodium aluminum chloride ($NaCl \cdot AlCl_3$) is a preferred carrier to employ, but other materials such as thallium oxide ($TlO_2$), iron chloride ($FeCl_3$), gallium chloride ($GaCl_3$ or $GaCl_2$), and elemental sulfur can be used with good results.

Also, relatively low melting metal alloys can be used, such as alloys of bismuth, lead and tin. Alloys consisting essentially of bismuth and lead, and in some instances containing minor quantities of tin, cadmium, lead or mercury, or combinations thereof, give good results. For example, plumbers' solder (67% lead and 33% tin), type metal (82% lead, 15% antimony and 3% tin), and Wood's metal (50% bismuth, 25% lead, 12.5% tin and 12.5% cadmium), can be used. With such alloys, it is preferred to disperse titanium trichloride particles on the surface of the molten alloy, use mild pressure to force the particles into the molten surface if necessary, and rapidly cool the alloy to the solid state.

The polymerization of a normally gaseous olefin is performed in an inert, liquid reaction medium. Saturated hydrocarbons including the pentanes, hexanes, heptanes, octanes, decanes, mixtures thereof and the like, cycloparaffins such as the cyclopentanes, and cyclohexanes, and mixtures thereof with each other and with paraffins can be used with good results. The form of the catalytic composition can be varied according to the polymerization procedure used. For example, the catalytic composition of the invention can be in the form of a relatively flat bed with metal halide particles partially embedded in the surface thereof. The bed can be contained, for example, in the bottom of a reactor, with a liquid inert reaction medium containing a dissolved olefin maintained in contact therewith. It is preferred, in this embodiment, to prepare the catalyst bed in the reactor to be used for the polymerization. After the polymerization, polymer is removed from the catalyst surface by mild scraping or the like, so that the surface of the catalytic composition is regenerated and can be used for additional polymerization. Where particles or pellets containing particles of the metal halide dispersed throughout the solid carrier are employed, polymerization can be performed by maintaining the catalytic composition as a dispersion in an inert, liquid reaction medium containing dissolved olefin. When pellets of the catalyst are used, they are advantageously maintained as a fixed catalytic bed, and the olefin in solution contacted therewith by passing the solution through the bed. Polymer is readily removed from such particles or pellets by mild grinding. When necessary, or desirable, such grinding can be performed to remove the surface of the pellet or particle and thereby present a fresh surface, containing fresh, exposed surfaces of dispersed metal chloride particles, for further polymerization.

In a specific embodiment of the invention the catalytic composition is removed from the polymer to form a polymer essentially free from contamination by residual components of the catalyst or carrier. This is accomplished by dissolving the carrier material in a solvent such as water or an aqueous inorganic acid, thereby exposing the embedded portion of the catalyst particles to the solvent. The solvent is preferably selected so that the carrier and catalyst particles are both dissolved in one operatin, but a second solvent for the catalyst particles can be used if desired.

Polymerization conditions are employed during the polymerization step. The temperature can be varied from about 0° C. o 170° C., it being necessary to maintain the temperature below the melting point of the solid carrier material. Pressure can be varied from about atmospheric to 5,000 p.s.i.g. (pounds per square inch gauge) and good results obtained, but subatmospheric pressure can be employed in many instances with good results. The olefin concentration in the liquid reaction medium will vary depending on the polymerization conditions employed, but in general from 3% to 25% by weight or more is used. Sufficient time should be allowed to obtain the desired degree of polymerization, or to complete the polymerization reaction.

The following specific embodiment illustrates the process of the invention in which "parts" refers to parts by weight. Into a reactor are introduced 18 parts of sodium aluminum chloride and the reactor heated to a temperature of about 190° C. so that the sodium aluminum chloride melts and forms a pool on the bottom of the reactor. Titanium trichloride particles are dispersed on the surface of the molten sodium aluminum chloride, about 1.65 parts of the titanium trichloride being used. The molten salt is then rapidly cooled so that the particles of titanium trichloride are partially embedded in the surface thereof. About 700 parts of n-heptane containing 0.53 part of aluminum triisobutyl is then introduced into the reactor with stirring. With continued agitation, propylene is then introduced into the reactor to a pressure of about 160 p.s.i.g. The pressure is maintained at substantially this value by periodic addition of propylene. Continuous stirring is employed during the polymerization process, and the temperature is maintained in the range of from about 80° C. to 96° C. After 6 hours, the reaction is stopped and solid polypropylene removed from the catalyst bed by mild scraping. The n-heptane and polymer are removed from the reactor and the reactor is then ready for use in another polymerization. In the process, substantially anhydrous and oxygen-free conditions are maintained. Polymer is separated from a major proportion of the liquid reaction medium by draining and is washed with fresh n-heptane in order to insure complete removal of any adhering aluminum triisobutyl. The n-heptane is removed by evaporation. The recovered polypropylene polymer has a molecular weight of about 200,000 a density of about 0.91 and a melting point of about 165° C.

To illustrate another embodiment of the process, catalyst is prepared and olefin polymerized as above described. After polymerization, the catalyst bed is fractured and an aqueous 5% hydrochloric acid solution added, sufficient acid being added to dissolve the sodium aluminum chloride and the particles of titanium trichloride. After draining the acid, the polymer is washed with methanol and dried. Polypropylene substantially free from residual catalyst or carrier components is recovered.

In a further embodiment of the process, 1 part of sodium aluminum chloride is heated to about 190° C.

and 1 part of titanium trichloride admixed therewith. Mixing is continued to form a homogeneous admixture and the admixture is rapidly cooled. The resulting composition is comminuted and sorted according to particle size. Particles having a size of from 4 to 40 mesh (U.S. sieve series) are then used for the polymerization of propylene by dispersing the catalytic composition in isooctane and bubbling propylene through the solution at a pressure slightly above atmospheric and a temperature of 105° C. When the catalyst particles are substantially completely coated with polymer product, as indicated by lack of consumption of propylene, the reaction is stopped. The catalyst particles containing adhered polymer are separated and lightly ground in a ball mill. Polymer and catalyst particles are then separated by flotation in isooctane, polypropylene being recovered from the surface. The dispersion of the catalyst particles in isooctane is then used for polymerization of propylene to form more polypropylene.

Other embodiments within the scope of the invention will be apparent to those skilled in the art.

The invention claimed is:

1. A composition of matter consisting essentially of solid particles of titanium trichloride firmly embedded in a solid carrier having a melting point below 440° C. selected from the group consisting of sodium aluminum chloride, thallium oxide, ferric chloride, gallium chloride, sulfur and a metal alloy, a portion of the surfaces of said solid particles being exposed to the environment surrounding said composition.

2. Composition according to claim 1 wherein said carrier material is sodium aluminum chloride.

3. Composition according to claim 1 wherein said carrier material is a low melting metal alloy.

4. Composition according to claim 1 wherein said carrier material is sulfur.

5. A composition of matter consisting essentially of solid particles of zirconium trichloride firmly embedded in a solid carrier having a melting point below 350° C. selected from the group consisting of sodium aluminum chloride, thallium oxide, ferric chloride, gallium chloride, sulfur and a metal alloy, a portion of the surfaces of said solid particles being exposed to the environment surrounding said composition.

6. Composition according to claim 5 wherein said carrier material is sodium aluminum chloride.

7. Composition according to claim 5 wherein said carrier material is a low melting metal alloy.

8. Composition according to claim 5 wherein said carrier material is sulfur.

9. A process for preparing a composition of matter which comprises contacting titanium trichloride at a temperature below about 440° C. with an inert normally solid carrier in the molten phase selected from the group consisting of sodium aluminum chloride, thallium oxide, ferric chloride, gallium chloride, elemental sulfur and a metal alloy, and cooling said carrier to a point below its melting point.

10. Process according to claim 9 wherein said carrier material is sodium aluminum chloride.

11. Process according to claim 9 wherein said carrier material is a low melting metal alloy.

12. Process according to claim 9 wherein said carrier material is sulfur.

13. A composition of matter consisting essentially of a material selected from the group consisting of: (A) solid particles of a chloride of titanium firmly embedded in a solid carrier having a melting point below 440° C. selected from the group consisting of sodium aluminum chloride, thallium oxide, ferric chloride, gallium chloride, elemental sulfur and a metal alloy, wherein said titanium has a valence of 2 to 3 and (B) solid particles of a chloride of zirconium firmly embedded in a solid carrier having a melting point below 350° C. selected from the group consisting of sodium aluminum chloride, thallium oxide, ferric chloride, gallium chloride, elemental sulfur and a metal alloy, wherein said zirconium has a valence of 2 to 3, a portion of the surfaces of said solid particles being exposed to the environment surrounding said composition.

14. A process for preparing a composition of matter which comprises contacting zirconium trichloride at a temperature below about 350° C. with an inert normally solid carrier in the molten phase selected from the group consisting of sodium aluminum chloride, thallium oxide, ferric chloride, gallium chloride, elemental sulfur and a metal alloy, and cooling said carrier to a point below its melting point.

15. In a process wherein propylene is polymerized by contacting propylene dissolved in an inert liquid hydrocarbon medium, under polymerization conditions, with a catalyst composition consisting essentially of a metal halide and a metallo-organic activator therefor selected from the group consisting of alkali metal hydrides, alkali metal aluminum hydrides, alkali metal borohydrides, metal alkyls wherein said metal is selected from the group consisting of aluminum, zinc, beryllium, chromium, magnesium, and lead, halides of said metal alkyls, and alkali metal alkyls, and wherein solid polypropylene is thereafter recovered from the reaction mixture, the improvement which comprises using as said metal halide component of said catalyst composition a material selected from the group consisting of (A) solid particles of a chloride of titanium firmly embedded in a solid carrier having a melting point below 440° C. selected from the group consisting of sodium aluminum chloride, thallium oxide, ferric chloride, gallium chloride, elemental sulfur, and a metal alloy, wherein said titanium has a valence of 2 to 3 and (B) solid particles of a chloride of zirconium firmly embedded in a solid carrier having a melting point below 350° C. selected from the group consisting of sodium aluminum chloride, thallium oxide, ferric chloride, gallium chloride, elemental sulfur, and a metal alloy, wherein said zirconium has a valence of 2 to 3 and a portion of the surfaces of said solid particles are exposed to the environment surrounding said composition.

References Cited in the file of this patent

UNITED STATES PATENTS

| | | |
|---|---|---|
| 2,412,550 | Bond | Dec. 10, 1946 |
| 2,721,189 | Anderson et al. | Oct. 18, 1955 |
| 2,827,447 | Nowlin | Mar. 18, 1958 |
| 2,840,551 | Field | June 24, 1958 |
| 2,843,577 | Friedlander | July 15, 1958 |

FOREIGN PATENTS

| | | |
|---|---|---|
| 533,362 | Belgium | May 16, 1955 |
| 538,782 | Belgium | Dec. 6, 1955 |
| 1,132,506 | France | Nov. 5, 1956 |

OTHER REFERENCES

Emmett: "Catalysis" (1954), pages 245–251, pub. by Waverly Press, Inc., Baltimore, Md.